United States Patent [19]

Kruger

[11] 4,371,820
[45] Feb. 1, 1983

[54] ROTARY LINE TRANSFER SWITCH

[75] Inventor: Johann Kruger, San Carlos, Calif.

[73] Assignee: Electro-Motion, Inc., Redwood City, Calif.

[21] Appl. No.: 293,347

[22] Filed: Aug. 17, 1981

[51] Int. Cl.³ ............................................. G05B 5/00
[52] U.S. Cl. .............................. 318/468; 200/153 LA; 318/440
[58] Field of Search ............... 200/1 V, 51.03, 51.05, 200/51.06, 153 LA; 335/68, 69, 70, 73, 75; 307/43, 64, 68; 318/329, 331, 333, 468, 440

[56] References Cited

U.S. PATENT DOCUMENTS

| | | | |
|---|---|---|---|
| 2,783,394 | 2/1957 | Struthers | 307/64 |
| 2,861,198 | 11/1958 | Soos | 307/64 |
| 3,198,908 | 8/1965 | Staak | 335/69 |
| 3,584,172 | 6/1971 | Owen | 318/468 |
| 3,796,937 | 3/1974 | Loffler et al. | 318/468 |

*Primary Examiner*—Ulysses Weldon
*Attorney, Agent, or Firm*—Julian Caplan

[57] ABSTRACT

An improvement in oscillatory line transfer switches of the type having mechanical drive between a drive motor and the shafts of two such switches plus a manual mechanical switch to supplement the drive motor and having a third shaft mechanically connected into the same drive which controls a neutral position. An oscillatory switch system is used to switch from utility power sources to emergency power sources when the normal line supply is temporarily not available. This condition is sensed, an emergency generator activated, and, when the latter is up to needed voltage, the line transfer switches are thrown. After normal line voltage is restored, the switches oscillate back to normal power sources. A gear train causes at least two switches to turn simultaneously.

6 Claims, 4 Drawing Figures

ROTARY LINE TRANSFER SWITCH

This invention relates to a new and improved rotary line transfer switch. Reference is made to U.S. Pat. No. 3,796,937 on which the present invention is an improvement. A rotary switch system is used to switch from utility power sources to emergency power sources when the normal line supply is temporarily not available, either because of a decrease in line voltage or in frequency. The equipment senses when any one of the phases of the normal line voltage drops below a preselected percentage of normal. Thereupon a generator for auxiliary power is activated and, when this has been brought up to the needed voltage, the present invention provides a means to throw the line transfer control switch from normal line position to emergency line position. After normal line voltage has been restored, the switch transfers back to normal power source.

As disclosed in the aforesaid patent, a motor is turned by the sensing means, thereby turning a shaft. Turning of the motor turns a switch actuating lever which rotates the shafts of the line transfer switches. Manual override of the motor is also provided.

In accordance with the present invention, the motor causes oscillatory movement of the shaft of the first line transfer switch. By means of a gear train, the shaft of the second line transfer switch is simultaneously turned.

In accordance with the present invention, a handle is connected to the shaft of one of the rotary switches and by means explained in U.S. Pat. No. 3,796,937, when the operator wishes to override the drive motor, the handle may be turned to accomplish that result. Provision is made in accordance with the present invention to interlock the two switches so that it is impossible that both switches be closed at the same time, a situation which would burn out the switches. The arrangement is such that one switch must be opened before the other can be closed. On the other hand, a neutral switch is of a type which makes contact before breaking the previous contact.

A further improvement of the present invention is the provision of an off-on switch for the drive motor to inactivate the same.

A still further feature of the invention is the provision of a brake on the motor to prevent overrun.

Other objects of the present invention will become apparent upon reading the following specification and referring to the accompanying drawings in which similar characters of reference represent corresponding parts in each of the several views.

Figure 1:
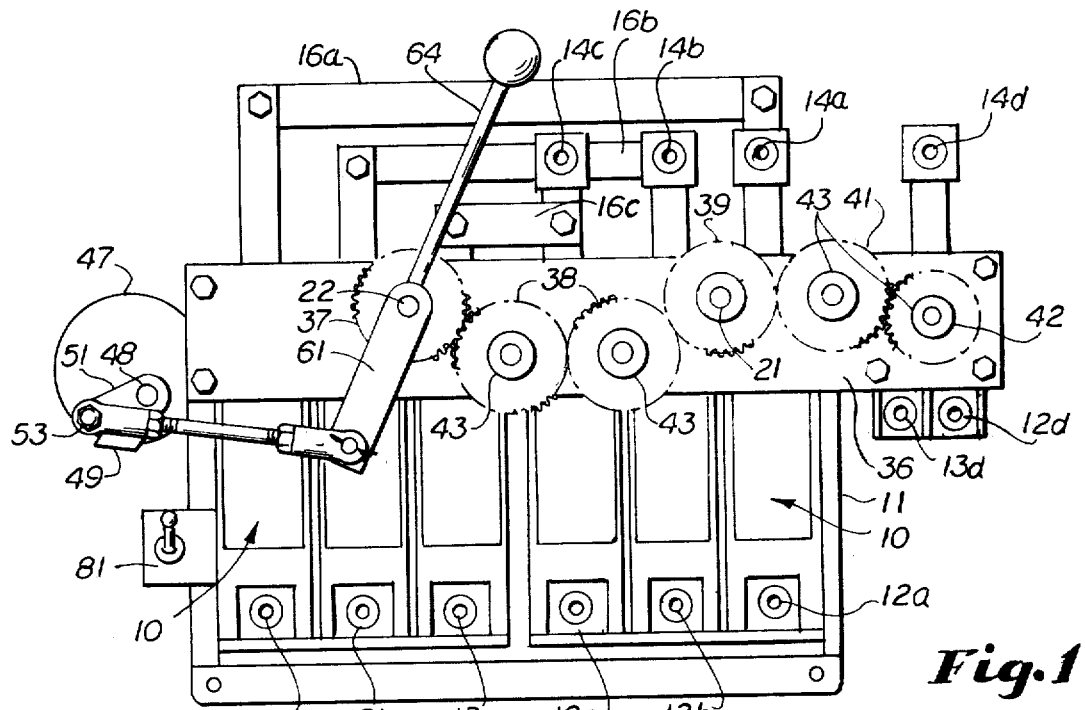
FIG. 1 is a top plan view with the top guard removed to reveal internal construction.

As has been stated, many of the elements of the present device are similar to those shown in U.S. Pat. No. 3,796,937 and, hence, reference is made thereto for explanation of some of the similar elements. The casing 11 surrounds and encloses two rotary line transfer switches 10. A preferred switch 10 is manufactured by Klockner-Moeller and is known as N11-400-CNA. The casings for such switches 10 are preferably of a molded clear plastic so that the mechanisms are visible and it is possible to determine whether the contacts are open or closed. Nine terminals for connection to three-phase lines are provided and are mounted on the casing 11. Thus terminals 12a,b,c are for the three phases of the normal power source, usually a utility power line. Terminals 13,a,b,c are for the emergency power source, usually an engine-generator set frequently used in hospitals, commercial and industrial buildings where outages of utility power may have serious consequences. Terminals 14,a,b,c are for connection to the load. Busses 16a,b,c connect the corresponding output terminals of the two switches 10. Hence, regardless of whether normal power or emergency power is being provided at a given instant, the load 14a,b,c is properly connected.

Figure 2:
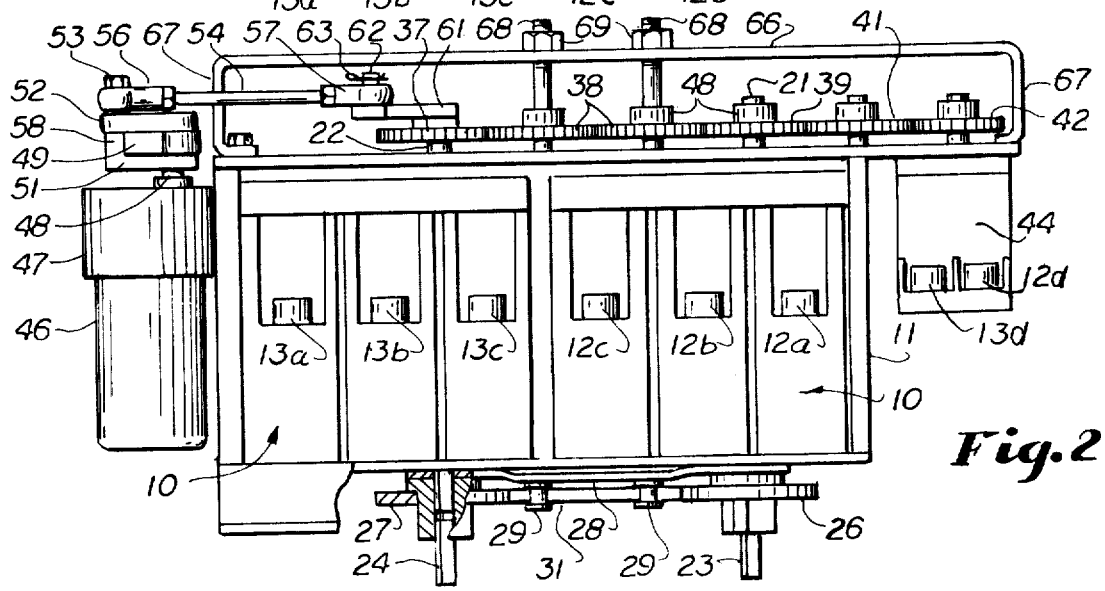
FIG. 2 is a side elevational view partly broken away to reveal internal construction.

Shaft 21 extends up through the top of the emergency power casing 10 and shaft 22 extends up from the normal switch casing (left hand side of FIGS. 1 and 2). By internal mechanism, not herein illustrated, provided by the manufacturer of the switches 10, when the shaft 21 or 22 is turned, the rotary switches for all three phases are turned simultaneously.

Figure 3:
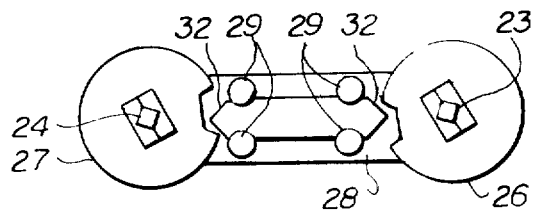
FIG. 3 is a fragmentary bottom plan of a portion of FIG. 2.

An interlock is provided to insure that, at no time, are both of the switches 10 closed. The interlock assures that, before either of the switches 10 may be closed, one of the switches must be opened. Such interlock is manufactured by Klockner-Moeller and is designated by Catalog No. KV-2NZM11. For interlock purposes, a non-circular bottom extension 23 of shaft 21 and a non-circular bottom extension 24 of shaft 22 are each provided with cams 26,27 having low dwells as shown in FIG. 3. Mounted below the casing 11 between the shafts 23,24 is a connector 28 having depending therefrom guides 29 for a horizontally reciprocating slide 31. The enlarged heads of the guides 29 restrain the slide 31 to movement parallel to the connector 28. At either end of the slide 31 is a pointed cam follower 32 which engages one or the other or neither of the cams 26,27. The distance between the points 32 with reference to the shapes of the cams 27 is such that at no time can both switches 10 be closed, but one of the switches must be open before the other can be closed.

Horizontal base 36 is fixed to the top of casing 11 and provides for a mounting for various gears hereinafter described, all of which are provided with bearings 43. Gear 37 is mounted on shaft 22. A pair of direction changing idlers 38 are mounted on base 36, but are not connected to switches 10. Gear 39 is mounted on shaft 21. The dimensions of the gears 37,38,39 are such that the shafts 21,22 turn equi-angularly. Another idler 41 is mounted on base 36 and engages gear 39 and also meshes with gear 42. Gear 42 is mounted on the shaft of rotary switch 44 which may be a cam switch such as Klockner-Moeller switch T44/ez-60-7-NA.

Switch 44 is used with 3-phase, 4-wire power. Normal power neutral is connected to terminal 12d; emergency power neutral is connected to terminal 13d; the load neutral is connected to terminal 14d. Switch 44 closes its contacts from the alternate source (e.g. 13d) before opening its contacts from the previous source (e.g. 12d). This prevents momentary opening of the neutral which could otherwise cause high voltage to be applied to low voltage loads, thereby damaging these devices.

On the left side of casing 11, as viewed in FIGS. 1 and 2, is a motor 46 suitably geared down and provided with a brake 47 so that it turns only one revolution per cycle. The shaft 48 of the motor extends upward and has fixed thereto a crank 49. Loose on shaft 48 is bottom arm 51 below crank 49 and upper arm 52 above crank 49. Bolt 53 passes through threaded holes in the outer ends of arms 51,52 but does not pass through the crank 49. The connecting rod 54 carries, at its left end, end piece 56 which is apertured to receive bolt 53. End piece 57, at the opposite end of rod 54, is likewise provided. End pieces 56 and 57 and the opposite ends of rod 54 are oppositely threaded so as to adjust the over-all length of the rod 54 by twisting same. As motor 46 turns, it contacts upward extension 58 of arm 51 and causes the arms 51,52 to pivot about shaft 48 and, accordingly, to cause movement of rod 54. Fixed to shaft 22 and extending radially therefrom is a crank 61 carrying a pin 62 at its outer end which is received in end piece 57. A snap pin 63 passes through a diametric hole in pin 62. By removing the pin 63, the end piece 57 may be disconnected from pin 62 when required. Handle 64 also extends radially outwardly from and is fixed to shaft 22. The relationship of crank 49 relative to the arms 51,52 is such that when required, an attendant may shift the handle 64 manually through about 60° of travel and cause the shafts 21,22 to turn accordingly independently of the motor 46. On the other hand, when the motor 46 is again energized, the crank 49 again contacts the extension 58 and turns the shaft 22 through 60°, all as explained in U.S. Pat. No. 3,796,937.

Although the motor shaft 48 is illustrated in the drawings and described herein as connected to shaft 22, it will be understood that it could be connected to shaft 21.

As is clear from consideration of FIG. 1, when the motor 46 turns through one revolution, the crank 61 is moved in a counterclockwise direction 60°. The next time the motor 46 is energized, the crank 61 is moved in the opposite direction 60°. Such movement of crank 61 is transmitted both to shafts 22 and 21, as well as to the shaft of rotary switch 44. Alternatively, an attendant may shift the handle 64 through 60° of travel independently of motor 64. Nevertheless, when the motor 46 is again energized, the crank 61 is again shifted 60°. In emergency situations, by removing the pin 63 and disengaging the end piece 47 from the pin 62, purely manual switching may be acccomplished through the handle 64.

As a protection against injury of personnel, a cover 66 having depending legs 67 fixed to the base 36 extends above the gears 37-42. The cover 36 may be held down also by extensions 68 of the shafts of idler gears 38 which protrude through holes in cover 66 and carry nuts 69.

Figure 4:
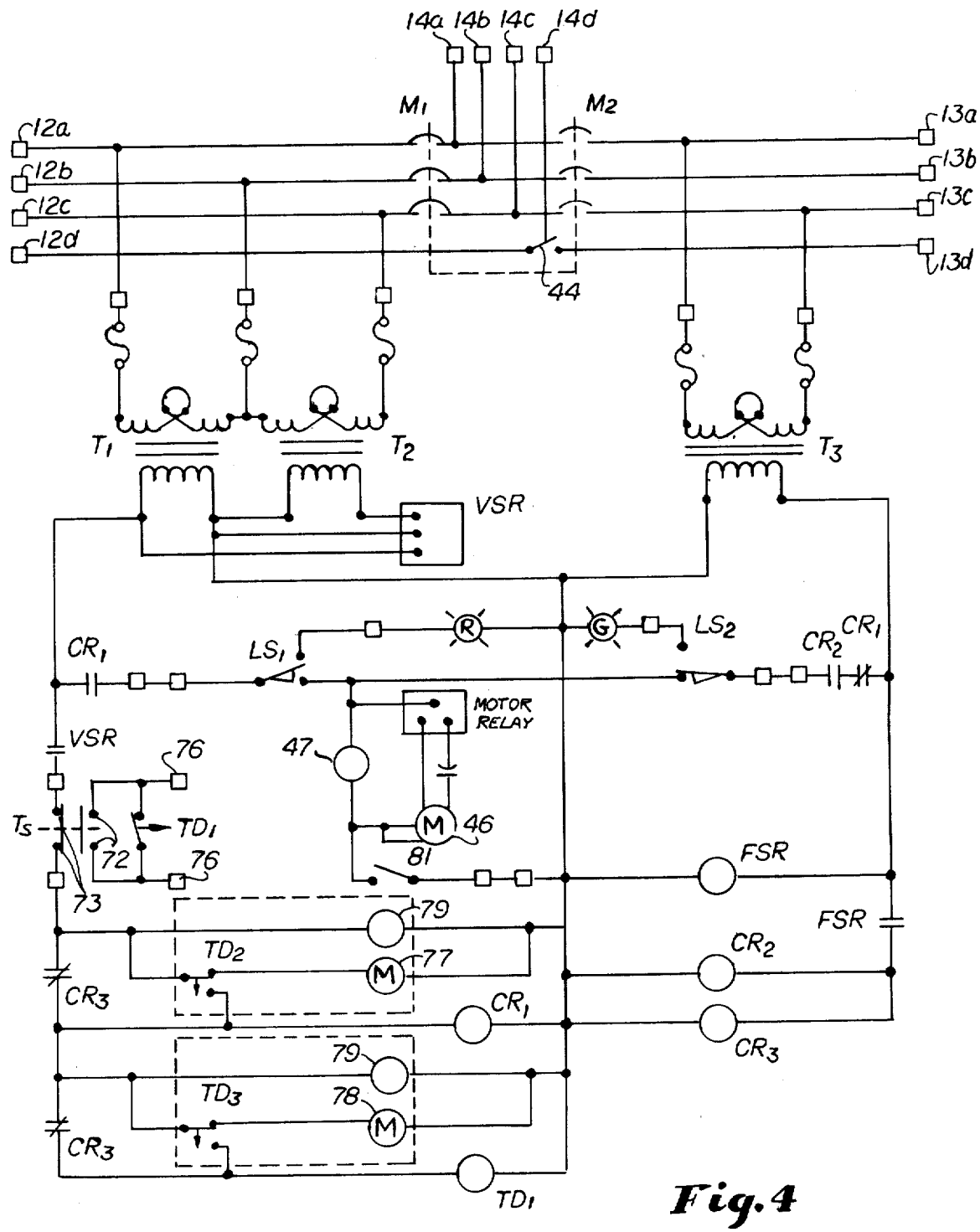
FIG. 4 is a schematic wiring diagram of the electrical

Directing attention now to the wiring diagram of FIG. 4, the load terminals 14a-c may be connected either to the normal power supply terminals 12a-c or the emergency power terminals 13a-c depending upon the position of the lever 61 (not shown in FIG. 4 but readily understood). When normal power is carrying the load, it passes through contacts M1 and is also sensed by voltage sensitive relay VSR via transformers T1 and T2. VSR closes its contacts to complete a circuit to TD1, TD2 and TD3. Indicator lamp R is illuminated. Time delay relay TD1 is timed on dropout and picks up to open the circuit between the terminals 76, causing the engine-generator set to stop and hence stopping supply of power to terminals 13a-c.

Time delay relays TD2 and TD3 time out, transferring their contacts to deenergize their drive motor 77,78, respectively, but leaving their clutch coils 79 energized. Although not illustrated in FIG. 4, motors 77 and 78 have coils which cause the contacts of TD$_2$ and TD$_3$ to be changed in well known manner.

If, for some reason, power supply should fail either in a single phase or in entirety or drop below 70% of voltage, VSR senses such condition, opening its contacts and deenergizing coils TD1, TD2, TD3 and control relay CR1. All of these drop out, except TD1 which commences timing and when timed out, closes its contacts to short out terminals 76. This sends a start signal to the engine-generator set.

If normal power is restored before the timing out of time delay TD1 is complete, TD1 will stop timing and will reset back to its maximum time point and the start signal to the engine-generator set will not be initiated. Hence, the standby system ignores very short duration power outages.

If normal power is out long enough (a time interval which is variable but is preferably about 2½ seconds) to allow TD1 to complete its timing, the standby engine generator will be started and when its output reaches 80% nominal voltage, such condition will be sensed by frequency sensitive relay FSR and transformer T3. When the frequency reaches a set point (e.g. 57.5 cycles for a normal 60 cycle system or 48 cycles of a normal 50 cycle system) relay FSR contacts are closed and coils CR2 and CR3 are energized. CR3 operates to remove time delay bypass in the normal power control. CR2 closes its contacts to complete the circuit to the drive motor 46 via CR1. Normally closed contacts LS2 contacts and disconnect switch 81. Switch 81 is a manual switch located on the casing 11 and is normally closed, but may be opened manually when the control system is to be disconnected.

When drive motor 46 is energized, it opens main contacts M$_1$ and when they are open closes main contacts M2 allowing the standby power to supply the load. When the drive motor 46 completes one cycle of its operation, it transfers contacts of LS1 and LS2 and the indicator light G is now lighted through switch LS2.

When normal power is again restored, it is sensed by relay VSR which closes its contacts, energizing timer TD2. Timer TD3, TD1 and relay CR1 are not energized because relay CR3 is now operated and its contacts are opened. TD2 commences timing and when completed transfers its contacts to deenergize its drive motor 77 and energize coil CR1 and timer TD3. Relay CR1 operates, opening its contacts in series with switch LS2 to extinguish lamp G and prevent a retransfer and closing its contacts in series with LS1 to energize the drive motor 46. Drive motor 46 operates to open main contacts M1, connecting the load to normal power supply and again transfers contacts LS2 and LS1. Lamp R is again lighted. Timer TD3 now commences timing and when it times out causes its contacts to transfer, deenergizing motor 78 and energizing timer TD1. Timer TD1 operates, opening its contacts to remove the short between the terminals 76 which causes the engine generator set to stop. When the engine slows to lower speed, relay FSR drops out, deenergizing relays CR2 and CR3. These relays, in turn, will drop out and contacts will be in initial positions.

If normal power is available and the generator is carrying its load but the generator should fail, relay CR3 will drop out, closing its contacts, bypassing TD2 and TD3. Relay CR1 will then pull in and cause the transfer switches 10 to connect the load to normal power source.

The test switch TS shown in FIG. 4 is a 3-positioned switch having "LT Test", "Normal" and "Engine Test" positions. When it is placed in "Engine Test" position its contacts 72 close to short out terminal 76. The engine starts and operates, but no transfer takes place unless the normal power source should fail. When switch TS is in "LT Test" position, contacts 73 are opened. This causes $TD_1$, $TD_2$, $TD_3$ and $CR_1$ to be de-energized, thus simulating a power failure. The Transfer switch then starts the engine and transfers the load to the generator as previously explained. The transfer switch can be operated manually by turning disconnect switch 81 to off position, removing the snap pin 63, removing the end piece 57 from the pin 62 and throwing the handle 64 to opposite direction.

The switch can be arranged to operate on a desired voltage by reconnecting the sensing transformers and adjustng the relay VSR to desired level. Further, the switch FSR will operate on any cycle by proper adjustment of relay FSR.

FIG. 4 also shows the wiring for switch 44, which switches with switches M1 and M2. The neutral fourth wires of the normal and emergency power source are wired to contacts 12d and 13d and the neutral load to 14d. The structure of switch 44 is such that it must establish contact of 14d with either 12d or 13d before it opens contact with either of the latter.

What is claimed is:

1. An oscillatory line transfer switch comprising a first oscillatory switch having a first casing and a first shaft extending externally of a first end of said first casing, a second oscillatory switch having a second casing and a second shaft extending externally of a first end of said second casing, a frame securing said casings together in side-by-side position, first means external of said casings for turning said first and second shafts together, at least two separate normal power input terminals for said first switch, at least two emergency power input terminals for said second switch, each said switch having at least two power output terminals, the corresponding power output terminals of said two switches being electrically connected together, second means sensing decline in voltage at said normal power input terminals below a pre-selected voltage, third means sensing frequency at said emergency power input terminals above a pre-selected frequency, a motor, a third shaft driven by said motor, fourth means for energizing said motor for rotation of said third shaft through one cycle of rotation upon energization of either said second or third means and fifth means mechanically connecting said third shaft to first shaft to oscillate said first and second shafts, said fifth means including a first crank fixed to said third shaft, an arm loose on said third shaft positioned to be turned by said first crank as said third shaft turns, a connecting rod, a pin pivotally connecting a first end of said connecting rod to said arm, a second crank fixed to said first shaft, the second end of said connecting rod being pivotally connected to said second crank, and manual means for oscillating said one of said first and second shafts independently of rotation of said third shaft.

2. A switch according to claim 1 in which first means comprises a base fixed to said frame apertured for passage of said first and second shafts and a gear train mounted on said base comprising gears fixed to said first and second shafts.

3. A switch according to claim 1 in which said first and second shafts extend externally of second ends of said casings opposite said first ends, first and second cams fixed to said first and second shafts, respectively, each said cam having a low dwell, a guide extending between said first and second shafts, a slide having cam followers at opposite ends mounted on said guide for reciprocatory movement, and cams and followers being dimensioned and positioned so that both said switches can be opened but only one said switch can be closed at any time.

4. A switch according to claim 1 in which said second end of said connecting rod is detachable from said second crank.

5. A switch according to claim 4 which further comprises a manual switch to disconnect said motor from said second means.

6. A switch according to claim 1 which further comprises a third oscillatory switch having a first neutral input terminal associated with said normal power input terminals, a second neutral input terminal associated with said emergency power input terminals, a neutral load terminal associated with said power output terminals, said third oscillatory switch having a fourth shaft, said first means turning said fourth shaft simultaneously with said first and second shafts, said third switch being constructed so that said neutral load terminal must always be in electrical communication with one of said neutral input terminals.

* * * * *